United States Patent
Tsai

(10) Patent No.: US 7,755,238 B2
(45) Date of Patent: Jul. 13, 2010

(54) POWER GENERATOR AND POWER GENERATING METHOD

(76) Inventor: Ming-Chun Tsai, No. 88, Haodeng 1st St., Lujhu Township, Taoyuan County (TW) 338

( * ) Notice: Subject to any disclaimer, the term of this patent is extended or adjusted under 35 U.S.C. 154(b) by 585 days.

(21) Appl. No.: 11/675,056

(22) Filed: Feb. 14, 2007

(65) Prior Publication Data
US 2008/0191490 A1 Aug. 14, 2008

(51) Int. Cl.
*H02K 5/16* (2006.01)
(52) U.S. Cl. .......................................... 310/90; 310/113
(58) Field of Classification Search .................. 310/90, 310/113; 290/55; 415/4.2, 4.3, 900
See application file for complete search history.

(56) References Cited
U.S. PATENT DOCUMENTS

| | | | | |
|---|---|---|---|---|
| 1,099,602 A | * | 6/1914 | Houtz | 415/4.1 |
| 1,315,595 A | * | 9/1919 | Clark | 415/4.4 |
| 1,333,981 A | * | 3/1920 | Hurt | 12/116.2 |
| 2,563,279 A | * | 8/1951 | Rushing | 415/4.3 |
| 4,068,131 A | * | 1/1978 | Jacobs et al. | 290/55 |
| 4,288,704 A | * | 9/1981 | Bosard | 290/55 |
| 4,328,428 A | * | 5/1982 | McGovern | 290/55 |
| 4,616,794 A | * | 10/1986 | King | 248/67.5 |
| 5,146,096 A | * | 9/1992 | McConachy | 290/44 |
| 5,182,458 A | * | 1/1993 | McConachy | 290/55 |
| 5,506,453 A | * | 4/1996 | McCombs | 290/44 |
| 7,255,527 B2 | * | 8/2007 | Hsu | 415/4.3 |
| 7,384,239 B2 | * | 6/2008 | Wacinski | 416/128 |

* cited by examiner

*Primary Examiner*—Thanh-Tam T Le
(74) *Attorney, Agent, or Firm*—Pai Patent & Trademark Law Firm; Chao-Chang David Pai

(57) ABSTRACT

A power generator includes a top, a support, a bearing, a rotating device and a transforming device. The top has a body and a spindle penetrating the center of the body, wherein the spindle is substantially vertical to the ground. The support is positioned on the ground to support one end of the spindle. The bearing holds the spindle and is located apart from the support. The rotating device rotates the top. The transforming device transforms the rotational energy of the top into power.

7 Claims, 8 Drawing Sheets

POWER GENERATOR AND POWER GENERATING METHOD

BACKGROUND

1. Field of Invention

The present invention relates to a power generator. More particularly, the present invention relates to a power generator with a heavy top.

2. Description of Related Art

With the rapid growth in commercial/industrial activities and comfortable living needs in recent years there is a higher demand and dependency on electric power. Currently, electric power is generated mainly from nuclear power, coal, oil, gas, wind, ground heat, and solar energy.

The energy resources on the Earth are continuously exhausted. However, power consumption is increasing every day. Therefore, the environmental demands are increasing and environmental pollution is getting worse. In view of the limited energy resources on the Earth, it is imperative for scientists to find new substitute energy.

Currently, there are pros and cons for nuclear power usage; its further development, in particular, has caused a long-term debate. As to waterpower, most of the water resources have been utilized and the impact of waterpower to Nature is always criticized; its future is also very limited. In addition, the environmental pollution and greenhouse effect due to burning coals are not yet solved, either.

Facing foreseeable energy shortages in the future and under the condition of being unable to find new substitute energy, it is of consequence to use any method and mechanism to generate the power to reduce the energy crisis impact for humans.

SUMMARY

According to one embodiment of the present invention, a power generator includes a top, a support, a bearing, a rotating means and a transforming means. The top has a body and a spindle penetrating the center of the body, wherein the spindle is substantially vertical to the ground. The support is positioned on the ground to support one end of the spindle. The bearing holds the spindle and is located apart from the support. The rotating means rotates the top. The transforming means transforms the rotational energy of the top into power.

According to another embodiment of the present invention, a power generating method includes the following steps: Firstly, a top is rotated. Then, the rotational energy of the top is transformed into power.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
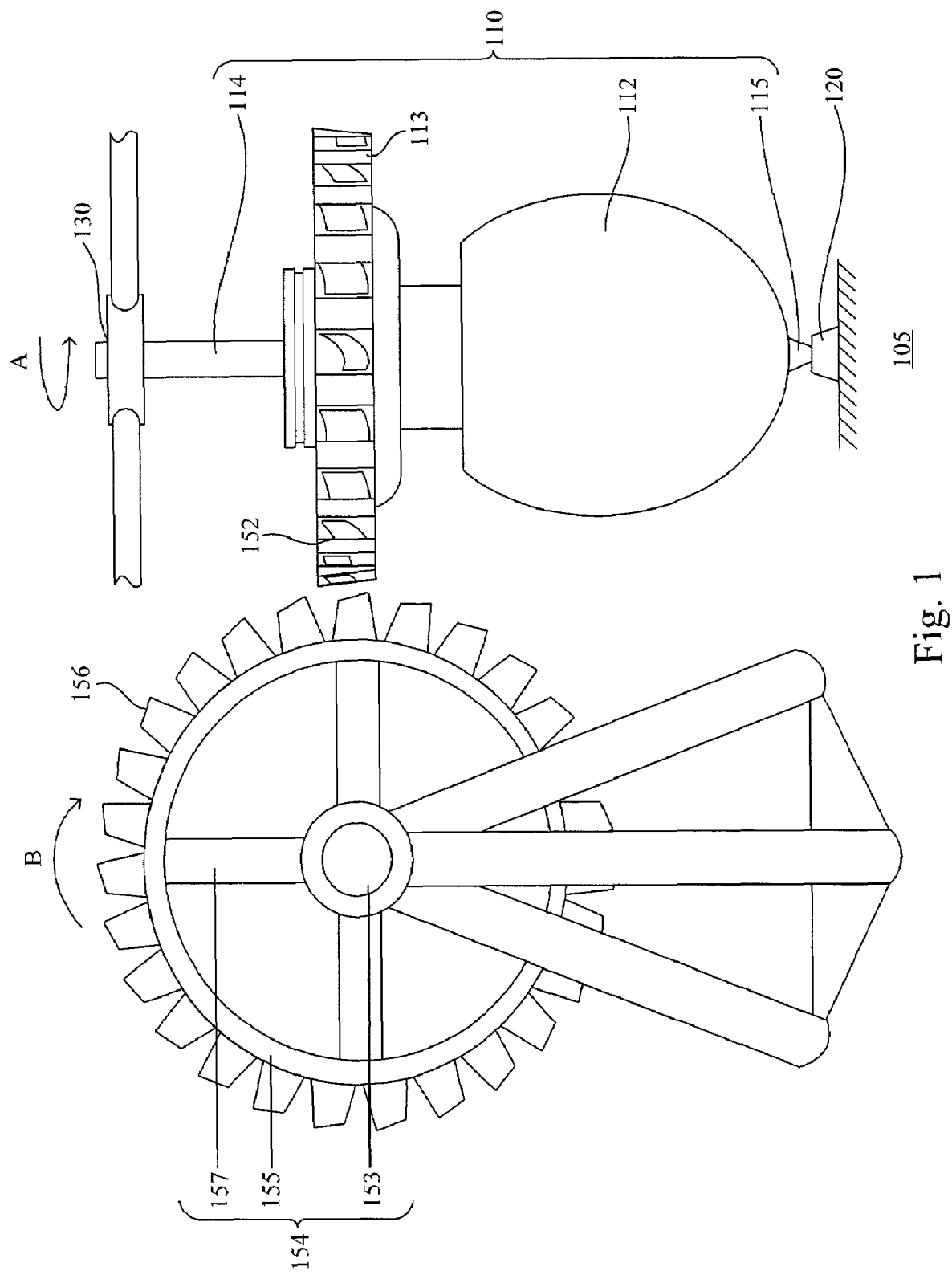
FIG. 1 is a side view of a power generator according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

Refer to FIG. 1. FIG. 1 is a side view of a power generator according to one embodiment of this invention. In FIG. 1, the power generator includes a top 110, a support 120, a bearing 130, a rotating means and a transforming means. The top 110 has a body 112 and a spindle 114 penetrating the center of the body 112, wherein the spindle 114 is substantially vertical to the ground 105. The support 120 is positioned on the ground 105 to support one end 115 of the spindle 114. The bearing 130 holds the spindle 114 and is located apart from the support 120. The rotating means rotates the top 110. The transforming means transforms the rotational energy of the top 110 into electrical energy (power).

Initially, a large amount of energy may be inputted into the rotating means to rotate the top. When the top starts rotating, only a little amount of energy is needed to maintain the rotation speed of the top. However, the top can output the rotational energy as long as the top is rotating. Therefore, if the top can be rotated for a long time, the power generator will operate economically.

Particularly, the support 120 may be a bearing base to reduce the friction between the end 115 of the spindle 114 and the support 120. Furthermore, the bearing 130 may be a magnetic bearing to reduce the friction between the spindle 114 and the bearing 130.

Figure 2:
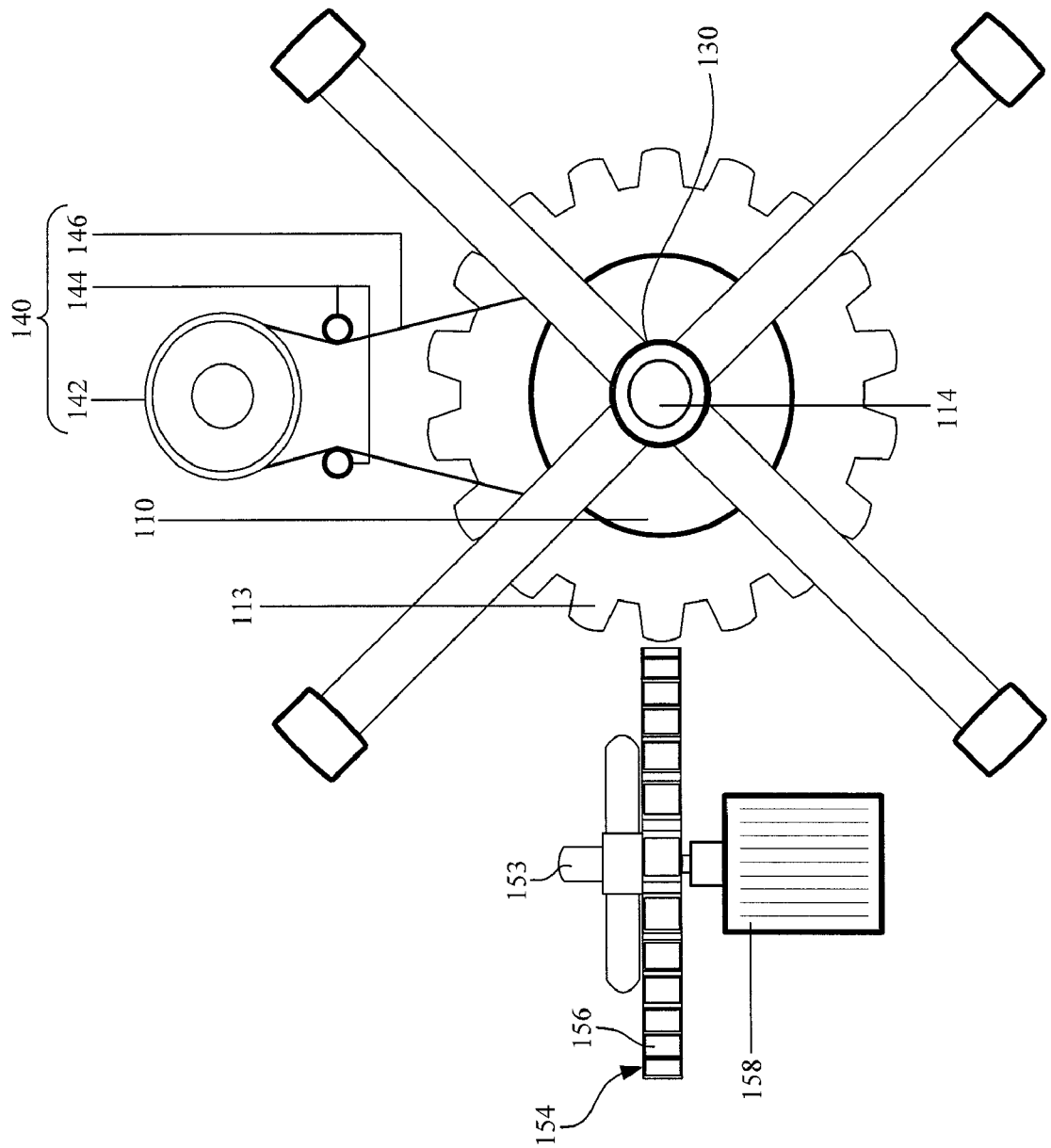
FIG. 2 is a top view of the power generator of FIG. 1.

Refer to FIG. 2. FIG. 2 is a top view of the power generator of FIG. 1. In this embodiment, the rotating means 140 may include a motor 142, at least one pulley 144 and a motor belt 146. The motor belt 146 connects the motor 142 to the top 110 through the pulley 144 such that the motor 142 is able to rotate the top 110.

Refer to FIG. 1 and FIG. 2. In this embodiment, the transforming means may include at least one first magnet 152, at least one spoke wheel 154, at least one second magnet 156 and a dynamo 158. The first magnet 152 is positioned on the top 110. The spoke wheel 154 is positioned adjacent to the first magnet 152. The second magnet 156 is positioned on the spoke wheel 154. The dynamo 158 is connected to the spoke wheel 154. Furthermore, the body 112 of the top 110 may include a non-ferromagnetic portion 113, e.g. a non-ferromagnetic gear, located around the first magnet 152. In addition, the spoke wheel 154 may be made of non-ferromagnetic materials as well.

Particularly, the first magnet 152 and the second magnet 156 may be repulsive to each other, that is, there may be repulsive forces pushing the first magnet 152 and the second magnet 156 away from each other. Therefore, the spoke wheel 154 is rotated in the direction of arrow B by the repulsive forces when the top 110 is rotated in the direction of arrow A. Simultaneously, the dynamo 158 is also rotated by the rotation of the spoke wheel 154 to generate electricity.

As shown in FIG. 1, the spoke wheel 154 may include a rotating axle 153, an edge part 155 and at least one arm 157.

The rotating axle 153 is parallel to the ground 105. The edge part 155 surrounds the rotating axle 153. The arm 157 connects the rotating axle 153 and the edge part 155.

Figure 3:
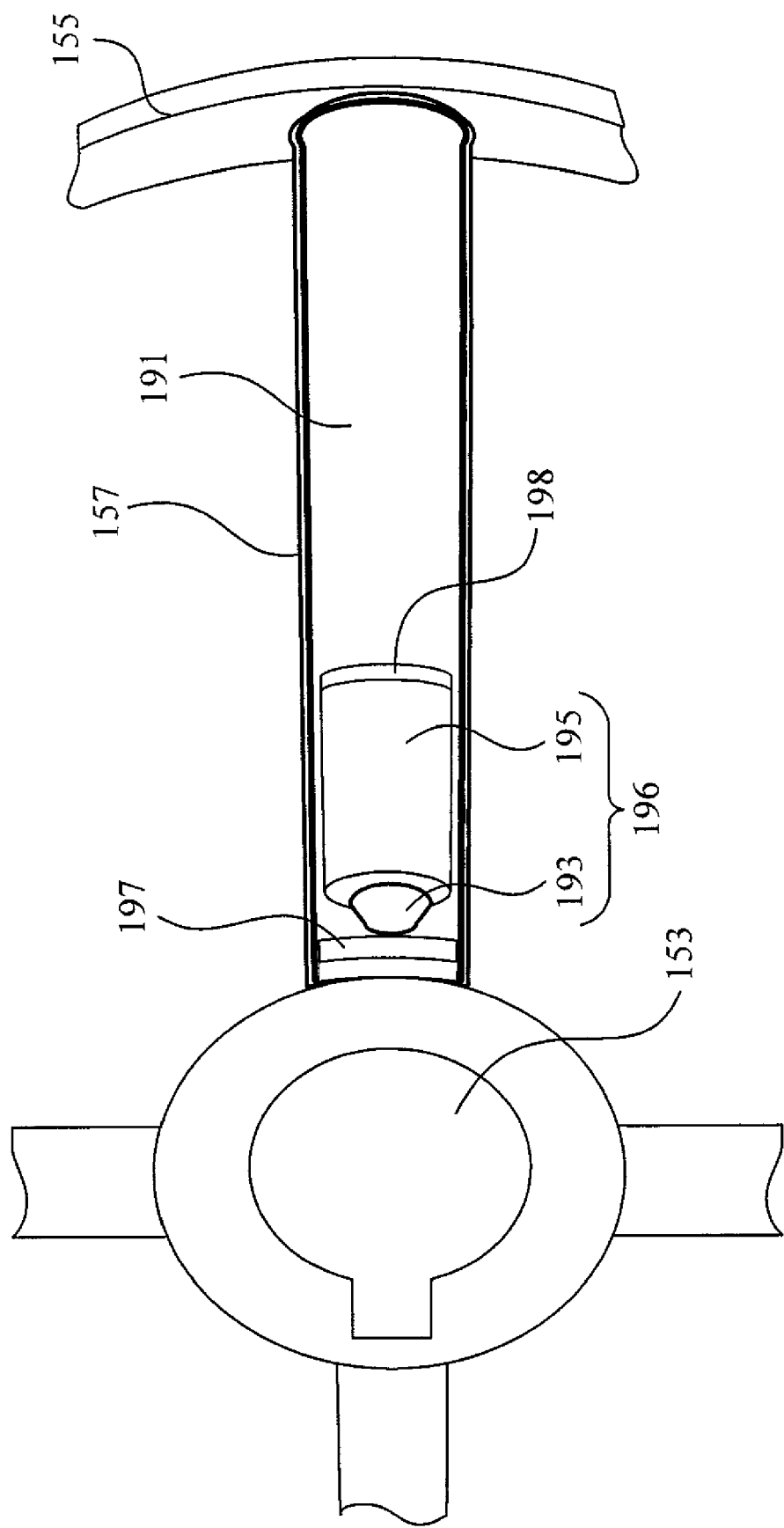
FIG. 3 is a perspective view of the arm of FIG. 1.

Refer to FIG. 3. FIG. 3 is a perspective view of the arm 157 of FIG. 1. In FIG. 3, the arm 157 may include a cavity 191, a third magnet 197 and a pellet 196. The cavity 191 is located inside the arm 157. The third magnet 197 is positioned in the cavity 191 and near the rotating axle 153. The pellet 196 is positioned in the cavity 191, and the pellet 196 has a ferromagnetic tip 193 opposite the third magnet 197. Moreover, the pellet 196 may be made of non-ferromagnetic materials 195 other than the ferromagnetic tip 193. In addition, there may be a rubber pad 198 attached to one end of the pellet 196 near the edge part 155.

When the spoke wheel is rotated, the pellet may move away from the rotating axle due to centrifugal forces, thereby the spoke wheel can be rotated more easily. Furthermore, the third magnet may attack the ferromagnetic tip to let the pellet return after the spoke wheel is stopped.

Figure 4:
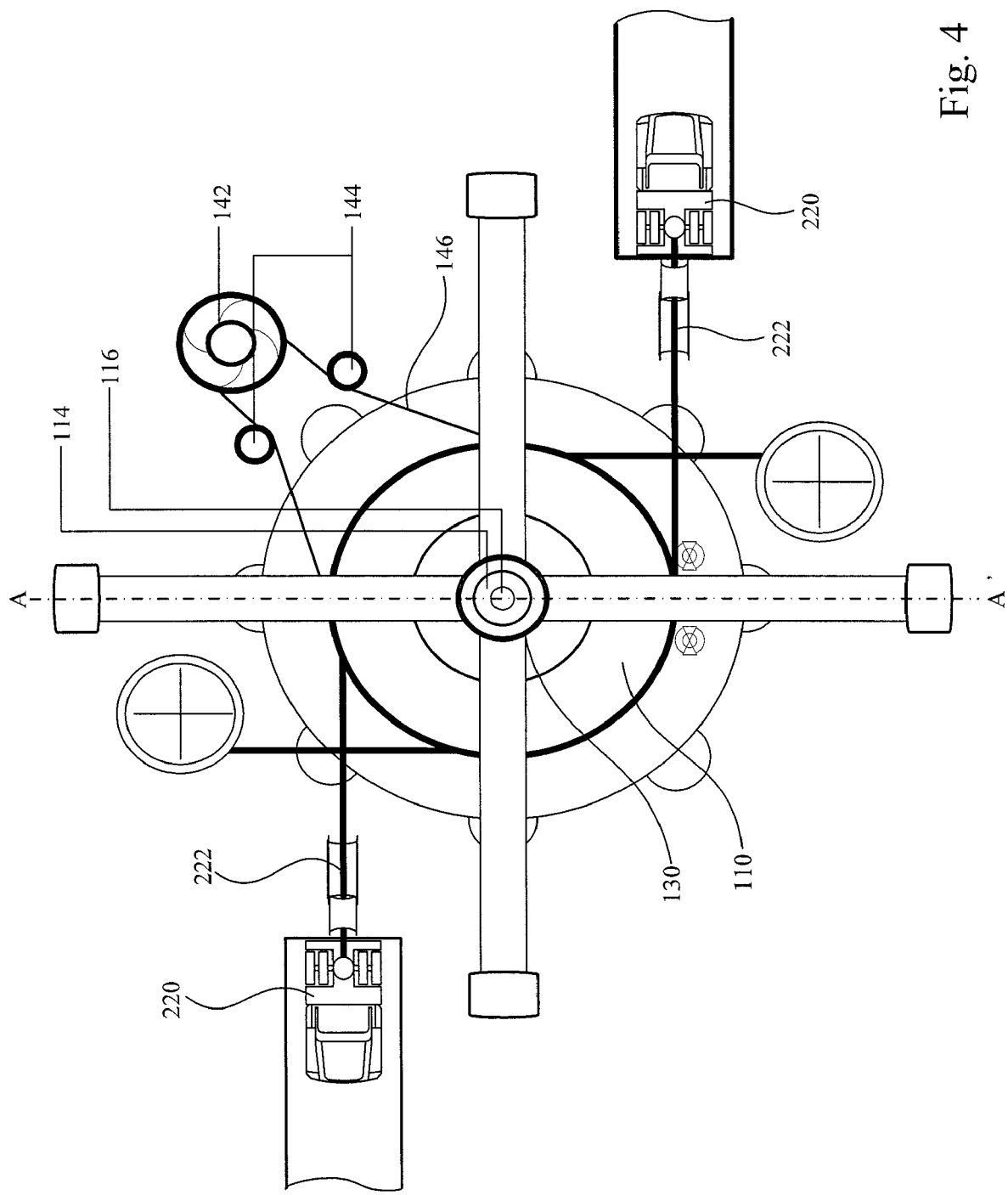
FIG. 4 is a top view of a power generator according to another embodiment of this invention.
Figure 5:
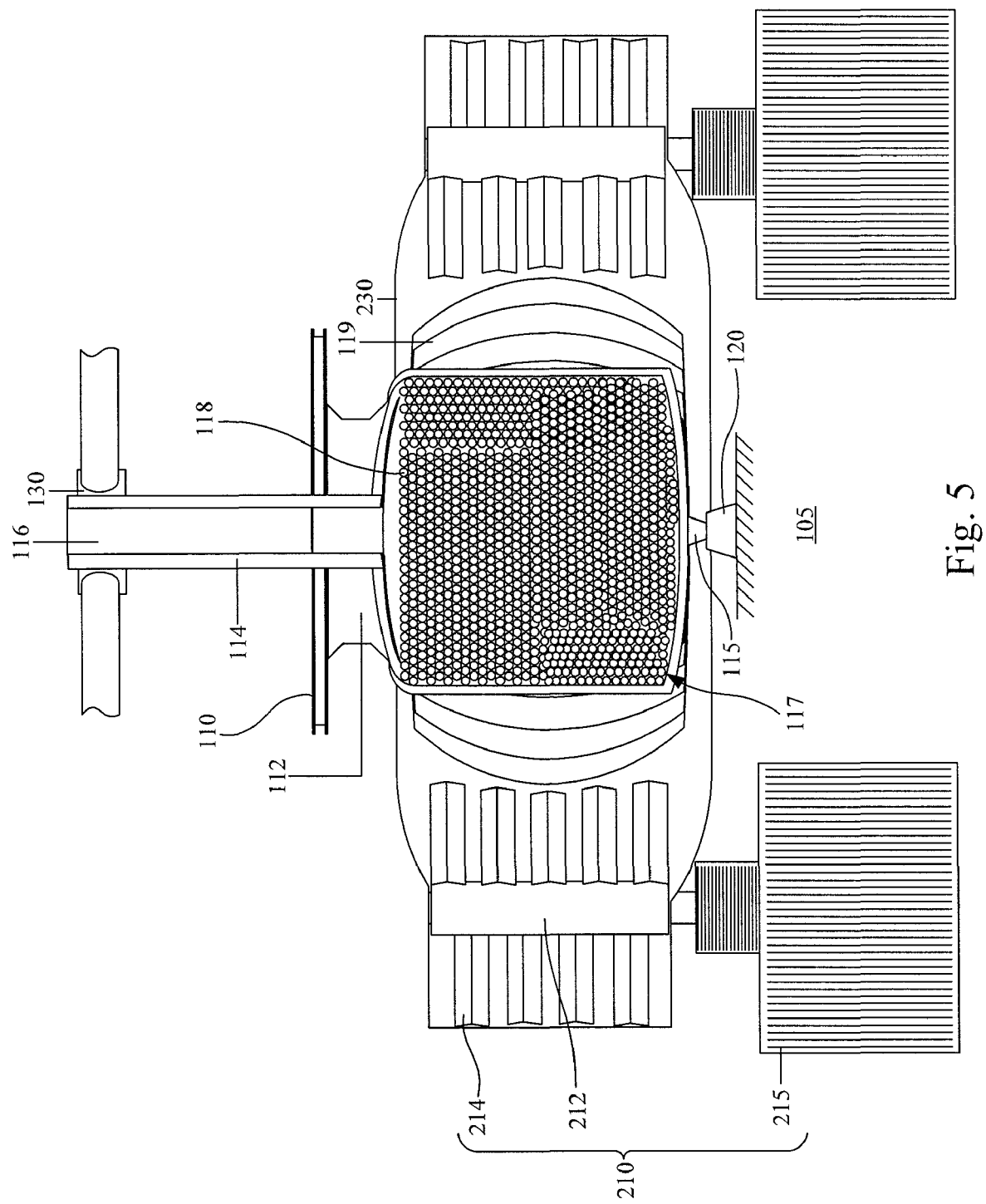
FIG. 5 is a sectional view along a line A-A' of FIG. 4.

Refer to FIG. 4 and FIG. 5. FIG. 4 is a top view of a power generator according to another embodiment of this invention, and FIG. 5 is a sectional view along a line A-A' of FIG. 4. In this embodiment, the power generator includes a top 110, a support 120, a bearing 130, a rotating means and a transforming means. The top 120 has a body 112 and a spindle 114 penetrating the center of the body 112, wherein the spindle 114 is substantially vertical to the ground 105. The support 120 is positioned on the ground 105 to support one end 115 of the spindle 114. The bearing 130 holds the spindle 114 and is located apart from the support 120. The rotating means rotates the top 110. The transforming means transforms the rotational energy of the top 110 into electrical energy (power).

Particularly, the support 120 may be a bearing base to reduce the friction between the end 115 of the spindle 114 and the support 120. Furthermore, the bearing 130 may be a magnetic bearing to reduce the friction between the spindle 114 and the bearing 130.

As shown in FIG. 4, the rotating means may further include at least one car 220 and at least one car belt 222 next to the motor 142, the pulley 144 and the motor belt 146. The car belt 222 connects the car 220 to the top 110. The motor 142, the pulley 144 and the motor belt 146 are the same as the previous embodiment. The car 220 may pull the car belt 222 to start the rotation of the top 110. After the top 110 starts rotating, the motor 142 may pull the motor belt 146 to maintain the rotation speed of the top 110.

As shown in FIG. 5, the body 112 of the top 110 may have a cavity 117 inside thereof to reduce the weight of the top 110. Furthermore, the top 110 may have an opening 116 connected to the cavity 117 of the body 112. Accordingly, the top 110 may start rotating more easily because the weight of the top 110 is reduced. After the top 110 starts rotating, at least one filler 118 may fill the cavity 117 through the opening 116 to increase the weight of the top 110. The top 110 may be heavier than the transforming means after the top 110 starts rotating such that the power generator would operate more economically. In this embodiment, the filler 118 may include a plurality of non-ferromagnetic balls, e.g. a plurality of lead balls.

Refer to FIG. 5. FIG. 5 shows that the transforming means may include a container 230, at least one first blade 119 and a fluid turbine generator 210. The container 230 contains fluid. The first blade 119 is located on the top 110 and is positioned in the container 230 to force the fluid to flow. The fluid turbine generator 210 transforms the fluid flow into electricity.

Figure 6:
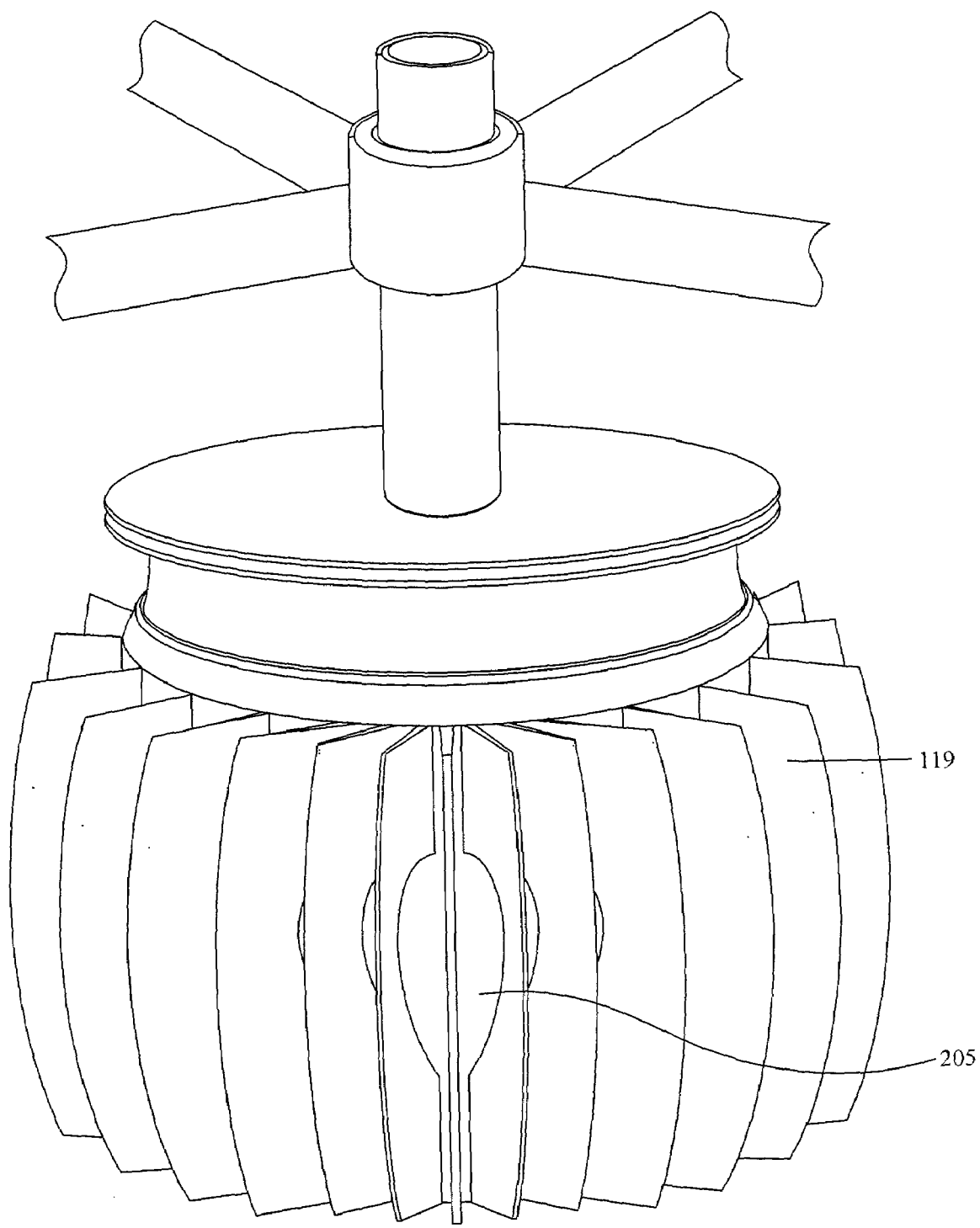
FIG. 6 is a three dimensional view of the first blade of FIG. 5.

Refer to FIG. 6. FIG. 6 is a three dimensional view of the first blade 119 of FIG. 5. In this embodiment, the first blade 119 may have a hole 205 located thereon to regulate the fluid flow. As shown in FIG. 6, the hole 205 of the first blade 119 may be elliptical.

Figure 7:
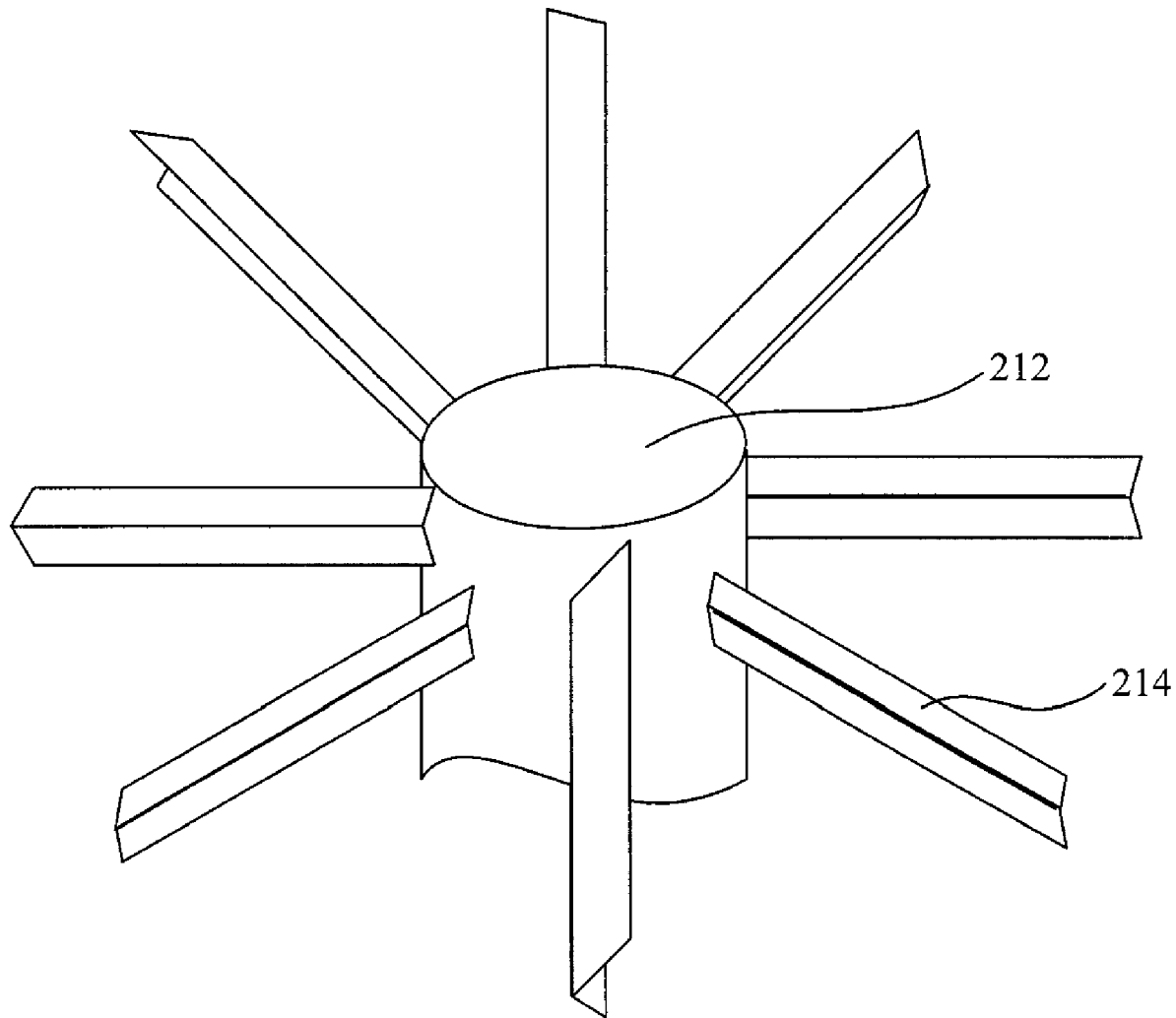
FIG. 7 is a three dimensional view of the second blade of FIG. 5.

Refer to FIG. 5 and FIG. 7. FIG. 7 is a three dimensional view of the second blade 214 of FIG. 5. In this embodiment, the fluid turbine generator 210 may include a rotor 212, at least one second blade 214 and a dynamo 215. The second blade 214 with a V-shaped section is positioned on the rotor 212 to be pushed by the fluid flow, thereby the rotor 212 can be rotated with the rotation of the top 110. The dynamo 215 is connected to the rotor 212 to transform the rotational energy of the rotor 212 into electricity.

Figure 8:
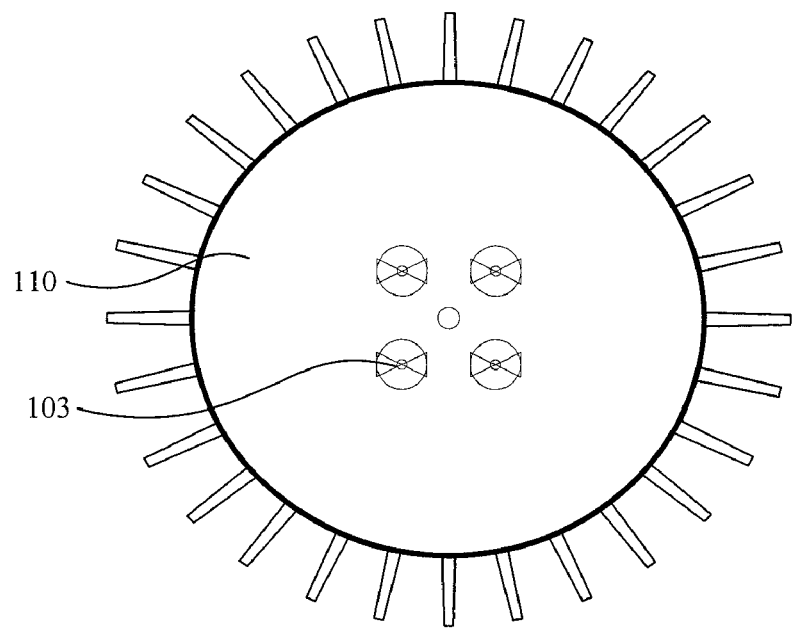
FIG. 8 is a bottom view of the top of FIG. 5.
Figure 9:
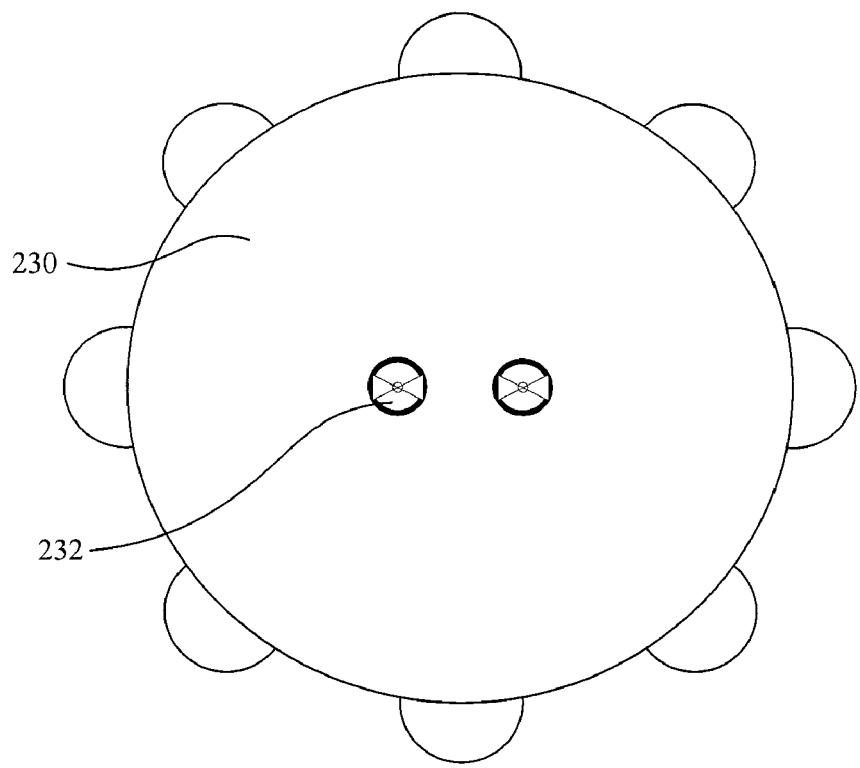
FIG. 9 is a bottom view of the container of FIG. 5.

Refer to FIG. 8 and FIG. 9. FIG. 8 is a bottom view of the top 110 of FIG. 5, and FIG. 9 is a bottom view of the container 230 of FIG. 5. In this embodiment, there may be several offload valves 103/232 mounted on the bottom of the top 110 and the bottom of the container 230 respectively. The offload valve 103 mounted on the bottom of the top 110 offloads the filler. In addition, the offload valve 232 mounted on the bottom of the container 230 offloads the fluid.

Yet another embodiment of the present invention provides a power generating method. The power generating method includes the following steps: Firstly, a top is rotated. Then, the rotational energy of the top is transformed into electrical energy (power).

More specifically, a cavity of the top may be hollowed to reduce the weight of the top before the top is rotated. Accordingly, the top may start rotating more easily because the weight of the top is reduced when starting the rotation of the top.

Furthermore, the cavity of the top may be filled with at least one filler to increase the weight of the top after the top is rotated. Therefore, the power generating method would operate more economically because the weight of the top is increased after the top starts rotating.

Although the present invention has been described in considerable detail with reference certain embodiments thereof, other embodiments are possible. For example, there may be a water gate separate the fluid turbine generator from the top to make the maintenance of the fluid turbine generator easier. Therefore, their spirit and scope of the appended claims should no be limited to the description of the embodiments container herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power generator, comprising:
a top comprising:
a body; and
a spindle penetrating the center of the body, wherein the spindle is disposed substantially vertical to the ground;
a support positioned on the ground to support one end of the spindle;
a bearing holding the spindle and located apart from the support;
a rotating means for rotating the top; and
a transforming means for transforming the rotational energy of the top into power, wherein the transforming means comprises:
at least one first magnet positioned on the top;

at least one spoke wheel positioned adjacent to the first magnet;

at least one second magnet positioned on the spoke wheel; and a dynamo connected to the spoke wheel.

2. The power generator of claim 1, wherein the support is a bearing base.

3. The power generator of claim 1, wherein the bearing is a magnetic bearing.

4. The power generator of claim 1, wherein the rotating means comprises a motor.

5. The power generator of claim 1, wherein the spoke wheel comprises:

a rotating axle parallel to the ground;

an edge part surrounding the rotating axle; and at least one arm connecting the rotating axle and the edge part.

6. The power generator of claim 5, wherein the arm comprises:

a cavity located inside the arm;

a third magnet positioned in the cavity and near the rotating axle;

a pellet positioned in the cavity, and the pellet has a ferromagnetic tip opposite the third magnet.

7. The power generator of claim 1, wherein the body of the top comprises a non-ferromagnetic portion located around the first magnet.

* * * * *